United States Patent
Hansen et al.

(10) Patent No.: US 7,421,679 B2
(45) Date of Patent: Sep. 2, 2008

(54) METHOD, APPARATUS AND INTERFACE FOR TESTING WEB SERVICES

(75) Inventors: Jeffery Hansen, Lakewood, CO (US); Jeremy Luke, Denver, CO (US); Mark Hurt, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 602 days.

(21) Appl. No.: 10/254,179

(22) Filed: Sep. 24, 2002

(65) Prior Publication Data

US 2004/0060057 A1    Mar. 25, 2004

(51) Int. Cl.
*G06F 9/45* (2006.01)
(52) U.S. Cl. ........................................ 717/124
(58) Field of Classification Search ............... 717/124, 717/136, 513, 515, 705, 760
See application file for complete search history.

(56) References Cited

U.S. PATENT DOCUMENTS

| | | | |
|---|---|---|---|
| 6,249,882 B1 * | 6/2001 | Testardi ........................ | 714/38 |
| 2002/0029377 A1 * | 3/2002 | Pavela ........................ | 717/124 |
| 2004/0015865 A1 * | 1/2004 | Cirone et al. ................ | 717/124 |
| 2004/0024841 A1 * | 2/2004 | Becker et al. ................ | 709/219 |
| 2004/0199636 A1 * | 10/2004 | Brown et al. ................ | 709/227 |

OTHER PUBLICATIONS

"Votable: A Proposed XML Format for Astronomical Tables", Roy William et al., http://cdsweb.u-strgsbg.fr/doc/Votable, Apr. 14, 2002, pp. 1-28.*
"XML Serialisation & Circular Reference", p. 1.*

* cited by examiner

*Primary Examiner*—Wei Y. Zhen
*Assistant Examiner*—Philip R. Wang
(74) *Attorney, Agent, or Firm*—Townsend and Townsend and Crew LLP

(57) ABSTRACT

The invention is related to systems and methods for creating an application call from an application definition. In certain embodiments, these systems and methods can be used to facilitate the testing of web services. According to one embodiment, a method for testing web services is provided. The method can comprise receiving application identification information from a user, wherein the application identification information includes the location of an application definition, accessing an application definition, which can be stored locally or on a remote computer, reading the application definition to determine a function and at least one variable element associated with the function, and prompting a user to enter data for each variable element requiring user input.

23 Claims, 20 Drawing Sheets

SOAP Request for getOrderID

```
POST /glue/exchange HTTP/1.1
Host: 151.119.195.226:8004
Content-Type: text/xml; charset=utf-8
Content-Length: 693
SOAPAction: mirrorCustomer <?xml version="1.0" encoding="utf-8"?><SOAP-ENV:Envelope xmlns:SOAP-
ENC="http://schemas.xmlsoap.org/soap/encoding/" xmlns:SOAP-
ENV="http://schemas.xmlsoap.org/soap/envelope/"
xmlns:xsi="http://www.w3.org/2001/XMLSchema-instance"
xmlns:xsd="http://www.w3.org/2001/XMLSchema"
xmlns:ns11="http://www.themindelectric.com/package/"><SOAP-
ENV:Body><tns:mirrorCustomer
xmlns:tns="http://www.themindelectric.com/wsdl/myJavaWebService/"><arg0
xsi:type="ns11:Customer"><fName xsi:type="xsd:string">doe</fName><lName
xsi:type="xsd:string">john</lName><mName
```

To copy the above SOAP Request, click on the textarea above, then press Ctrl-A and Ctrl-C.

[Display Formatted SOAP Request]

*Fig. 5A*

```
<?xml version="1.0" encoding="utf-8" ?>
- <SOAP-ENV:Envelope xmlns:SOAP-ENC="http://schemas.xmlsoap.org/soap/encoding/" xmlns:SOAP-
    ENV="http://schemas.xmlsoap.org/soap/envelope/"
    xmlns:xsi="http://www.w3.org/2001/XMLSchema-instance"
    xmlns:xsd="http://www.w3.org/2001/XMLSchema"
    xmlns:ns11="http://www.themindelectric.com/package/">
  - <SOAP-ENV:Body>
    - <tns:mirrorCustomer
        xmlns:tns="http://www.themindelectric.com/wsdl/myJavaWebService/">
      - <arg0 xsi:type="ns11:Customer">
          <fName xsi:type="xsd:string">doe</fName>
          <lName xsi:type="xsd:string">john</lName>
          <mName xsi:type="xsd:string">x</mName>
          <address xsi:type="xsd:string">my address</address>
        </arg0>
      </tns:mirrorCustomer>
    </SOAP-ENV:Body>
  </SOAP-ENV:Envelope>
```

METHOD, APPARATUS AND INTERFACE FOR TESTING WEB SERVICES

BACKGROUND OF THE INVENTION

The present invention relates generally to systems and methods for providing web services, and more specifically to systems and methods for creating application calls to facilitate the testing of such web services.

For years now, the Internet and the World Wide Web (the "Web") have been used to obtain and share information on any number of topics. Now, however, with the advent of the Extensible markup language ("XML") and other dynamic Web protocols and applications, such as Java, it is now possible to share and provide applications and services on the Web. Such services are now being referred to as "web services."

The web services movement is taking off because of the ease with which services can be offered and accessed. From a service provider's (e.g., electronic merchant's) point of view, if it can establish a web site, it can join the global marketplace. From a consumer's point of view, if you can type, you can access services provided by such a provider.

In the context of web services, the term "services" does not mean monolithic coarse-grained services like the retail services offered by Amazon.com™, but, rather, component services that others might use to build larger applications and thereby offer more robust services. Microsoft's™ Passport™, for instance, offers an authentication function exported to the Web. So hypothetically, an electronic newspaper like the New York Times™ can avoid creating its own user authentication service, instead incorporating the service provided by Passport™.

A more formal definition of a web service may be borrowed from IBM's™ tutorial on the topic:

"Web services are a new breed of Web application. They are self-contained, self-describing, modular applications that can be published, located, and invoked across the Web. Web services perform functions, which can be anything from simple requests to complicated business processes . . . Once a Web service is deployed, other applications (and other Web services) can discover and invoke the deployed service."

There are a number of companies and organizations active in developing web services applications. Examples of component services that are reusable building blocks include currency conversion, language translation, shipping, and claims processing, to name but a few.

As mentioned above, each of these web services can be used, either by the developing organization or a third party, either as standalone modules or to develop larger applications. This creates a problem, however, in that there currently exists no present facility for easily creating an application call in order to test a web service, whether developed in-house or acquired from an external developer. Because web services are designed for machine-to-machine communication, they are not particularly amenable to traditional methods of application testing.

For example, if a developer wants to test the functionality or performance of a web service under a certain set of conditions (e.g., processing a certain data set and/or operating under a certain load), that developer first must either develop a full-blown user interface for the web service (which is costly and time-consuming) or must develop an interim testing interface for the web service (which is usable only for that purpose and therefore unnecessarily wastes time that could be,spent developing the web service itself). Moreover, using either of these methods, testing usually is a labor-intensive, manual process involving much iteration, especially when performing regression testing, testing the output of a particular service in response to a variety of data sets or evaluating the performance of a particular web service in a production environment.

What is needed, therefore, is a tool for facilitating the automatic testing of a web service. Ideally, such a tool should provide a prefabricated interface allowing a user quickly to create application calls for a variety of web services, ranging from relatively simple objects (for instance, where the web service requires entry of only a single parameter) to relatively complex objects (for instance, where the web service contains a complex object comprising nested arrays or recursive functions).

BRIEF SUMMARY OF THE INVENTION

The invention is related to systems and methods for creating an application call from an application definition. In certain embodiments, these systems and methods can be used to facilitate the testing of web services. According to one embodiment, a method for testing web services is provided. The method can comprise receiving application identification information from a user, wherein the application identification information includes the location of an application definition, accessing an application definition, which can be stored locally or on a remote computer, reading the application definition to determine a function and at least one variable element associated with the function, and prompting a user to enter data for each variable element requiring user input.

In particular embodiments, the application information can further identify the nature of the application definition, and in other embodiments, reading the application definition comprises retrieving the application definition and parsing the application definition to determine a plurality of functions, each with at least one associated variable element.

According to some embodiments, the variable element comprises substantive data. In other embodiments, the method further comprises creating an application call from the function and the entered data. In still other embodiments, an HTML document can be created from the application call.

In some embodiments, the method further comprises transmitting the application call to a computer running a service, wherein the service corresponds to the application definition, and in certain of those embodiments, the method further comprises receiving a result from the computer, wherein the result is generated by the service in response to the application call.

According to some embodiments, the variable element comprises a complex type, wherein the complex type includes at least one parameter and the user can be prompted to enter data for the each parameter requiring user input. Such embodiments further can instantiate a new function using the entered data, and the new function also may comprise at least one variable element requiring user input. This process of prompting a user and instantiating a new function can be repeated until the new function includes no variable elements requiring user input. An application call thus can be created from the new function.

In some embodiments, the complex type can be a circular reference, a variable-length list, a variable number of lists, a variable number of variable-length lists, a combination of a circular reference and a variable-length list, a combination of a circular reference and a variable number of lists, or a combination of a circular reference and a variable number of variable-length lists.

According to another embodiment, a system is provided, wherein the system includes a first computer comprising a processor and a computer-readable medium in communication with the processor. In particular embodiments, the computer-readable medium comprises instructions executable by the processor to access an application definition, read the application definition to determine a function and at least one variable element associated with the function, and, using an output device in communication with the processor, prompt a user to enter data for each variable element that requires user input. The computer-readable medium can further include instructions executable by the processor to create an application call using the function and entered data.

According to some embodiments, the application definition is stored on a second computer remote from the first computer and accessing the application definition comprises establishing a network connection with the remote computer. According to other embodiments, the application definition is stored on a storage device in communication with the processor. In still other embodiments, wherein the computer-readable medium comprises further instructions executable by the processor to transmit the application call to a third computer running a service, wherein the service corresponds to the application definition, and to receive a result from the third computer, wherein the result is generated by the service in response to the application call. In certain embodiments, the third computer can be same computer as the first computer or the second computer.

In accordance with another embodiment, a computer program product is provided for testing web services, using the methods of the invention.

A more complete understanding of the present invention may be derived by referring to the detailed description of certain embodiments and appended claims, when considered in connection with the figures.

BRIEF DESCRIPTION OF THE DRAWINGS

FIGS. 5A and 5B illustrate example screen displays that can be used to display an application call according to certain embodiments of the invention.

FIGS. 12A-12D illustrate example screen displays that can be used to receive data for super-complex variable elements according to certain embodiments of the invention.

DETAILED DESCRIPTION OF THE INVENTION

Figure 1:
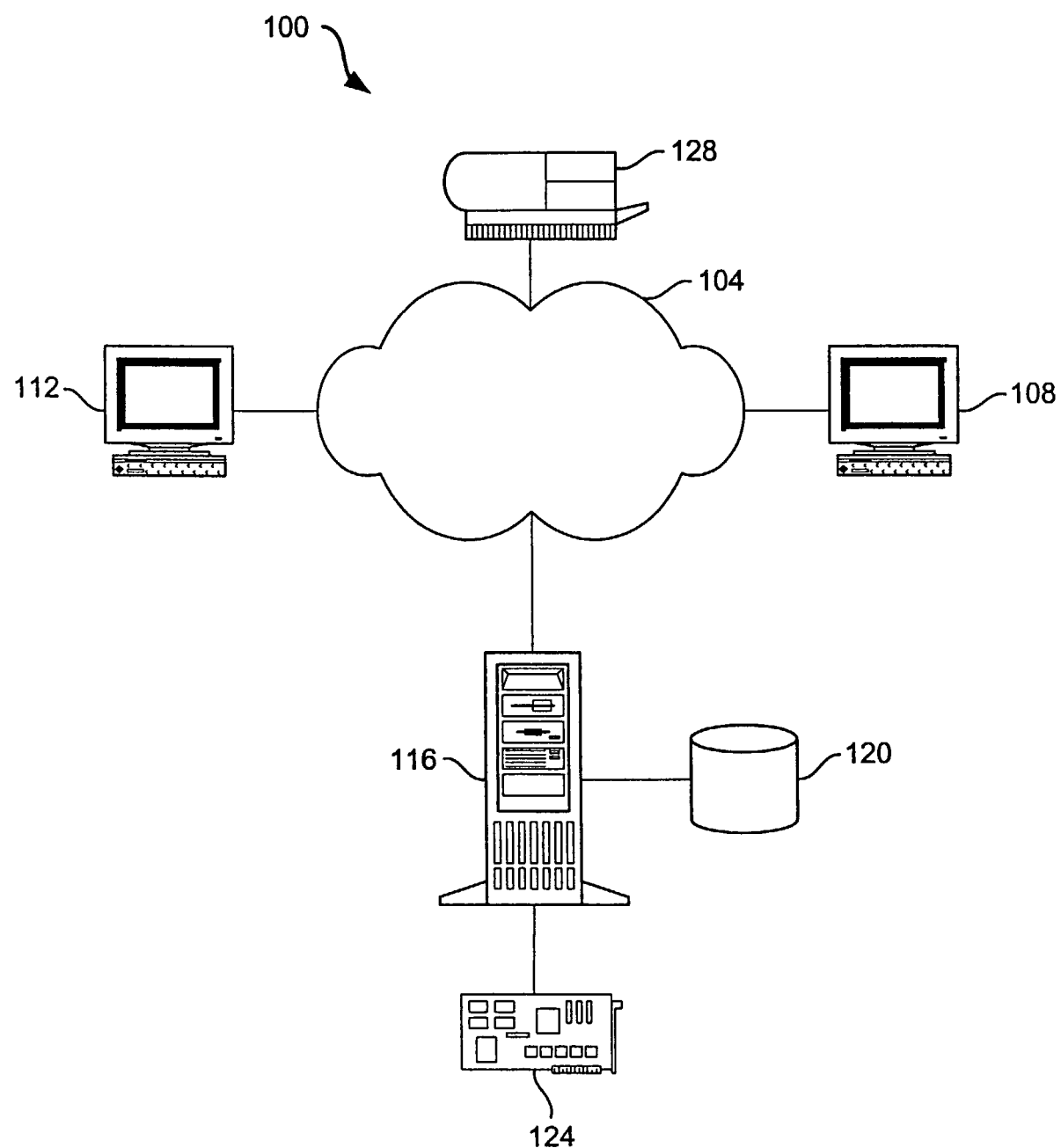
FIG. 1 illustrates a system that can be used to create application calls for testing web services according to certain embodiments of the invention.

In the past, testing of web services components and applications has been performed on an ad hoc basis, generally through an iterative, labor-intensive process of manually developing a testing interface for a particular component, providing values for each variable element in the component, executing the resulting application call, and repeating multiple times to satisfy the testing regime. In contrast, the present invention relates to methods and systems for facilitating the automated testing of web services applications, thereby saving substantial time and expense over prior testing methods. In particular, the present invention relates to methods and systems for efficiently creating application calls to a web service. The application calls can be used greatly to facilitate the testing of that web service. In certain embodiments, the present invention can be used to facilitate regression testing and/or performance testing of web services applications. Similarly, other testing methodologies familiar to those skilled in the art also may be accomplished using the methods and systems of the present invention.

Generally, a user wishing to create an application call from a particular application definition will first access that application definition, either over a network or locally on that user's computer, for instance using a web browser. For purposes of this document, the term "application definition" means any document (or part thereof) that describes or defines a service, software application, component, or the like (collectively referred to as "service") that can be used to process information using a defined architecture. One common use of application definitions is to describe web services, for instance using the Web Service Description Language ("WSDL"). Typically, such application definitions adhere to the Extensible Markup Language ("XML") format, although other definition languages currently existent or developed in the future also could be used to create application definitions within the scope of the present invention. Application definitions often are developed in compliance with one of several standards, including by way of example, the WSDL standard, Microsoft's™ .net™ framework, and The Mind Electric's™ GLUE™ framework, any of which can be accommodated by the present invention.

If desired, a user can build an independent application using one or more web services described by application definitions. In order to do so, however, the user generally will need to know how to formulate application calls to each service, as described by that service's application definition. As defined herein, an "application call" is any invocation of a service, using the functions and/or variable elements identified, described or defined by an application definition associated with that service. For ease of description, the term "function" is used to describe any self-contained block of source code (or resultant object code), which may include one or more methods, variables and other programming constructs. Thus, the terms "method," "object," and "class," as commonly used in the art, all are encompassed by the definition of "function" as used herein, and the term "function" can be applied recursively, such that each function can include one or more functions, including calls to itself.

The term "variable element" is used to describe any data element or structure (known in the art as a data type) that can be operated upon by a function. Hence, each function in an application definition typically includes one or more variable elements, although particular variable elements may be shared between multiple functions within an application definition and in fact between multiple application definitions. Variable elements range from simple to quite complex. One example of a simple variable element is an elementary data type such as a string, character, date/time, integer, whole number, and the like.

Complex variable elements include data types such as arrays, lists and the like. Notably, complex variable elements can comprise one or more simple variable elements; for instance, an array may contain multiple variable elements of string, character and/or whole number data types. Complex variable elements also are referred to herein as "complex types."

Finally, as described in more detail below, the present application supports super-complex variable elements, which can comprise multiple complex variable elements, for instance, an array of lists and the like. Super-complex variable elements also may feature recursion, for instance, a complex data type of which one included variable element is the same complex data type. One example of a method according to the invention that involves a recursive, super-complex variable element is described in detail below with respect to FIGS. 13-18.

Application calls can take many forms, as is known in that art, including for example a request formatted according to the Simple Object Access Protocol ("SOAP"), a Hypertext Transfer Protocol ("HTTP") request or the like. Generally, an application call will include specific parameters required by the application definition, and the application call often will cause the service identified by the application definition to process the supplied data to produce a result. Like the application call, the result can have one of several different formats, including by way of example a SOAP response, an HTTP message, a Simple Mail Transfer Protocol ("SMTP") message, or one of many other formats known in the art.

In certain aspects, therefore, the invention provides an efficient interface for creating an application call from an application definition. Referring to FIG. 1, a system 100 is displayed that can be used to create application calls according to certain embodiments of the invention. In the illustrated embodiment, system 100 operates in a network environment, illustrated generally by reference numeral 104. The network may be any type of network that links various computers together, including, for example, the Internet, an intranet, a local area network, a wide area network, a wireless network, and the like. Various computers 108, 112 are coupled to network 104 to facilitate the development and/or testing of web services. Merely by way of example, computer 108 may be a developer workstation and, computer 112 may be an application testing workstation. It will be appreciated, however, that any number of computers may be coupled to network 104 depending on the type and number of web services being developed and/or tested. Further, each of computers 108, 112 may be any type of input and/or processing device that is capable of communicating with a network. Merely by way of example, such computers may comprise workstations, desktop personal computers, laptop computers, mobile phones with microbrowsers, personal digital assistants, and the like. As shown, computers 108, 112 each have a display screen for displaying various information and may include an operating system (for instance, Microsoft™ Windows™ or any of the variety of UNIX™-based operating systems) and have a web browser (for instance, Microsoft™ Internet Explorer™ or Netscape™ Navigator™) to view documents formatted with the Hypertext Markup Language ("HTML"). These computers may also include various input devices, such as a keyboard and/or mouse, as is known in the art. Other components that may be used include disk drives, memory devices and the like as is known in the art.

In the illustrated embodiment, system 100 further includes a server computer 116 that comprises a processor (not shown), as well as a storage device 120 and a memory 124. Storage device 120 may be any device capable of storing and retrieving data in a non-volatile manner, for instance a hard disk drive, a redundant array of independent disks ("RAID"), or an optical storage device, such as a CD-ROM drive. Memory 124 can be any device capable of storing and retrieving data at relatively high speed, for instance a random access memory ("RAM") device. A large variety of storage and memory devices are known in the art, and any such device may be used without varying from the scope of the invention. Moreover, although shown as part of server 116 in the illustrated embodiment, storage device 120 and memory 124 instead may be independent devices that are accessible by server 120, perhaps via network 104.

Hence, by utilizing computers 108, 112, various users (e.g., application developers or testers) may develop, test and use web services residing on server 116, using network 104. In other embodiments, such services could be developed and/or tested locally, for instance, on computer 108, before optionally being transferred to server 116. Various output devices, such as a printer 128 may also be coupled to network 104 to output documents or information related web services applications.

According to the illustrated embodiment, server 116 can run a software application (the "software") capable on creating application calls according to the present invention. In certain embodiments, the software can be stored on storage device 120 or resident in memory 124. In other embodiments, however, the software can be running on a different computing device, for instance, user computer 108. Although the illustrated embodiment describes a single software application, those skilled in the art will recognize that the same functionality likewise could be implemented as a set of independent software applications, perhaps running on several different computers. The user can access the software, for instance by using a web browser running on computer 108, and specify a service for which an application call is desired, as described in detail below. According to the illustrated embodiment, the software then accesses the identified service and obtains an application definition for that service. Next, the system can identify each of the functions included in the application definition and allow the user to choose one or more functions for which to create an application call.

After the user chooses the desired function(s), the software can prompt the user for all necessary information to create the application call and present the user with a formatted application call that will provide the appropriate request to the service. Optionally, the software can transmit the application call to a server (perhaps server 116) and/or execute the application call and transmit any result to the user, perhaps via web browser.

Figure 2:
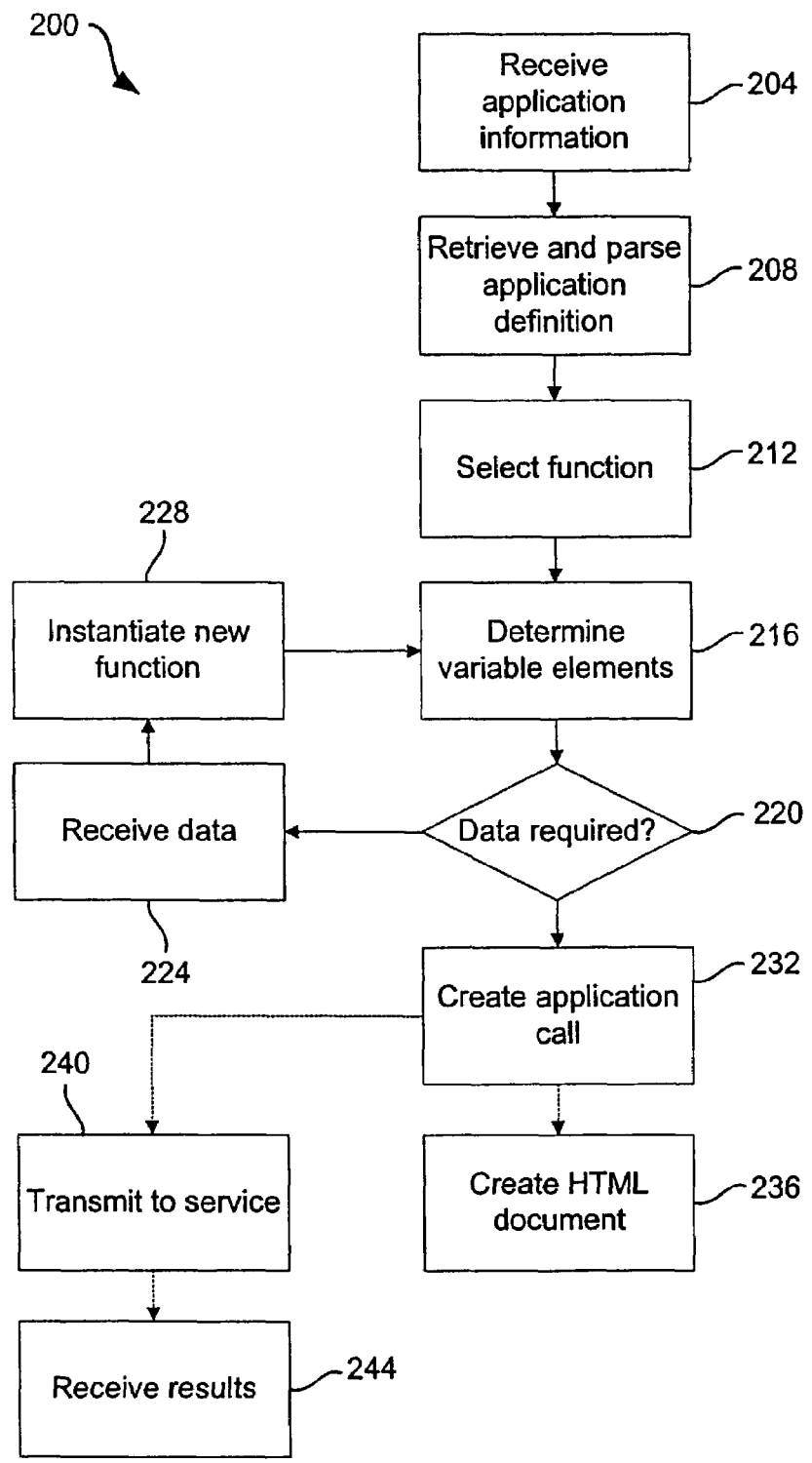
FIG. 2 is a process flow diagram that illustrates one method for creating application calls for testing web services according to certain embodiments of the invention.

Referring to FIG. 2, a method 200 is presented for creating an application call according to certain embodiments of the invention. For ease of description, method 200 is described by reference to system 100 illustrated in FIG. 1 and described above, although it will be appreciated that method 200 is system-independent and may be implemented in any fashion without varying from the scope of the invention.

At block 204, the software receives information about the service ("application information") from the user. Application information is any information that assists the software in determining the location, identity or properties of a service or its related application definition. Such information can include, for instance, the location of the application definition, (e.g., a uniform resource locator ("URL") pointing to the location of the application definition) as well as other identifying information, for instance, the type of service and/or application definition (e.g., WSDL service, .net™ component, GLUE object, or the like). The information may be transmitted to the software using any of a variety of methods known in the art.

Merely by way of example, if the software is running on server 116, the user can input the information into computer 108 transmit the information from computer 108 to server 116 as data formatted according to the HTTP (i.e., via a web browser), SMTP (i.e., using or electronic mail software) or File Transfer Protocol ("FTP") (i.e., using a file transfer program) standards. In other embodiments, the software might be a client/server application, such that a component of the software runs on computer 108 and transfers data using a standard or proprietary transfer method incorporated in the software itself. In still other embodiments the software can run completely on computer 108, and transferring information comprises directly inputting the information into the software, for instance with a keyboard.

The software can use the received application information to retrieve the appropriate application definition from the specified location (block 208). In certain embodiments, retrieval of the application definition includes parsing or interpreting the application definition to determine one or more functions and/or variables supported or required by the application definition.

As discussed above, in certain embodiments, the application information supplied by the user will include identification information to assist the software in determining the type of service to which the application definition pertains. In other embodiments, such identification can be accomplished automatically. By way of example, in one particular embodiment, the software can identify the service corresponding to a particular application definition by examining the filename extension of the application definition; for instance, an application definition with a filename ending in ".wsdl" indicates that the associated service is a GLUE™ service, while a filename ending in ".asmx?wsdl" corresponds to a .net™ service and a filename ending in ".wsdl.jsp" relates to a service developed with the BEA™ WebLogic™ platform. In another embodiment, the software can parse the application definition to determine the type of service to which the application definition pertains, for instance by seeking syntax unique to a particular service or interrogating any available header information. These and other methods of automatic identification are well known in the art, and any such method may be employed within the scope of the invention.

Whether performed automatically or through the supplied application information, identifying the type of service to which the application definition pertains can be useful because it allows the software more precisely to identify the functions and variable elements in a particular application definition. For instance, a WSDL application definition might delineate functions in a particular manner, while a .net™ application definition could use a different scheme to describe the functions within the application definition. Thus, it is beneficial for the software to identify the service to which a particular application definition pertains; nonetheless, such identification is not mandatory according to the invention. For instance, in certain embodiments, every application definition accessible by the software adheres to the same formatting standards regardless of the respective service to which it pertains, such that determination of the type of service is unnecessary. In other embodiments, the software has the ability to interpret the application definition regardless of the format with which it has been created, for instance by employing a heuristic algorithm to determine the functions and/or variable elements in the application definition.

In the illustrated embodiment, the software next allows the user to select the function for which the user would like to create an application call (block 212). The selected function typically will be an abstract function, such that none of the variable elements has been populated with data.

Selecting the function can be accomplished through a variety of methods. For instance, in certain embodiments, the software creates an HTML document (i.e., web page) with links for each of the functions included in the application definition. Such a web page may be created dynamically, as is known in the art, such that the information on the web page is created automatically and is not saved after the user's particular session has ended. Alternatively, the web page may be static, such that the content of the web page is saved by the software application, for example on storage device 120. In any event, in the described embodiment, the user may choose a function for which to create an application call merely by selecting the hyperlink for that function on the displayed web page. In other embodiments, the appropriate function may be selected using other means. For example, if the software is implemented in a proprietary client/server format, the software might generate a particular window from which the user may select the appropriate function. This and other selection methods may be used without exceeding the scope of the invention.

Once the desired function has been selected, the software determines each of the variable elements included in the function (block 216). Such a determination can include interrogating the function to identify each variable element that the function can process, ascertaining the complexity of each such variable element (e.g., simple, complex or super-complex), and determining the data type of each simple variable element as well as any necessary parameters for each complex or super-complex data type. For instance, in a function with a simple element entitled "age" of type "integer" and an array-of-strings element entitled "siblings" with a parameter "number of members," the software can determine that the user should provide a string for the string element and the number of members for the array.

According to the illustrated embodiment, if any data input is required from the user (block 220), the software will receive such data from the user (block 224). In certain embodiments, the software will first prompt the user to provide such data, for example by displaying a web page with fields for data entry, whereby each field can be accompanied by an explanatory label. For instance, in the example described above, the user would be presented with a web page having two fields: one labeled "age" and the other labeled "siblings." For the "age" field, the web page could include a notation that the field expects integer data. For the "siblings" field, the web page could include a notation that the field corresponds to an array and therefore expects a positive integer.

The user then may enter the desired data into each field, in the example by entering "12" in the "age" field and "3" in the "siblings" field. Entry of the desired data into a particular field may be accomplished according to any of several methods known to those skilled in the art. For instance, the user can be provided with a text-entry field into which any desired data can be typed. Alternatively, in some embodiments, a particular variable element may be of an enumerated type, such that there are a finite number of valid values that may be accepted by the function of which that element is a part. Merely by way of example, a variable element of the Boolean type generally accepts either a "true" or "false" value. Likewise, a service could define a variable element, for instance, of type "state," with enumerated values corresponding to the each of the fifty states. In such embodiments, the user can be provided with a menu or "pick-list" of such acceptable values for ease of data entry. Moreover, such a menu can also include a "bad value" entry, which does not correspond to any of the acceptable values. In this way, the error handling abilities of a particular service can be tested.

The user then can indicate to the software that data entry is finished, for example by pressing the "enter" key on the keyboard or by pressing an appropriate button on the web page. As noted above, although the described embodiment utilizes a standard web interface to interact with the user, other interfaces are possible; for instance, a customized graphical or text-based interface can be provided. Alternatively, the software could be configured to receive data from other sources, for instance a voice-recognition device (so that data could be provided via telephone or other voice communication device) or a text file containing delimited data, as known in the art. Regardless of the method, the software receives required data from the user (block 224). In certain embodiments, the received data can be validated, for instance by confirming that the each element of received data matches the data type expected for that element. In other embodiments, however, the software allows the user to provide invalid data (for example, providing a string value for a variable element of type integer), perhaps in order to allow for testing of a particular service's ability to handle invalid data.

The software then instantiates a new function (block 228) using the received data. Those skilled in the art will appreciate that instantiation can be any process whereby the received data is integrated into the function selected in block 212 to realize a function that incorporates the received data. In the described example, the function would have a value of "12" in place of the "age" element and an array of three members entitled "siblings." The newly instantiated function is then analyzed to determine the presence the remaining variable elements (block 216).

In some cases, for instance when the function selected in block 212 includes certain complex or super-complex variable elements, the instantiated function can require additional data from the user (as indicated by decision block 220). The example described above illustrates a case where additional data might be required from the user. For instance, although the simple variable element "age" is fully populated after the first iteration, the "siblings" element has been instantiated merely to an unpopulated array of three members, each of which now requires input of a string data type from the user.

If, as in this example, the function still contains variable elements requiring data from the user, the process described above repeats, with the user prompted to provide the additional data, which is received by the software (block 224). Another new function is then instantiated (block 228) and the new function is interrogated to determine remaining variable elements requiring user data (block 216). This "instantiation process" will repeat until it is determined that no more data is required from the user (block 220).

Notably, in some embodiments of the invention, the order of the operations in the method can vary from that illustrated in FIG. 2. For example, in certain embodiments, the software will first collect parameters for each complex or super-complex object and instantiate the function with those parameters before collecting data for simple elements. In this way, only in the final iteration (after all complex and super complex objects have been resolved) will data be collected for the simple variable elements. Returning to the example above, in such embodiments, the software will first prompt the user for the number of members in the "siblings" array and instantiate a new function based on the user's response to that prompt. In the second iteration, then, the software will prompt the user to provide data for both the "age" element and each member of the "siblings" array. Regardless of order, however, the software can receive all necessary data from the user and instantiate a function incorporating all of that data.

When all necessary data has been received from the user and incorporated into the selected function, an application call can be created (block 232). In creating the application call, the software can encapsulate the instantiated function (including all data received from the user) into a format understandable by the service corresponding to the application definition retrieved in block 208. As described above, one example of an application call is a SOAP request, which, as known to those skilled in the art, is a specially-formatted XML document that can perform procedure calls to a service, whether accessible locally (for instance on computer 108 or server 116 depending on the embodiment) or remotely, perhaps via a connection between network 104 and the Internet. The details of the SOAP standard are well known in the art and beyond the scope of this document, but it is sufficient to note that a SOAP request can include the location (e.g., URL) of the service, as well as instructions to invoke the service to operate on the data provided by the user. In a similar manner, other conventions may be used to format application calls.

Optionally, the application call can be saved and cataloged (perhaps as a hyperlink in a static or dynamic web page, in a manner similar to that described above). Thus, the user can access the application call at a later time by selecting the appropriate hyperlink. In this way, multiple application calls may be cataloged and/or saved together, perhaps in the same document with links to functions included in the application definitions, as described above.

Once an application call has been created, that application call can be displayed or saved in a specified format, such as an HTML document or the like (block 236), perhaps in response to the user selecting the hyperlink for that particular application call from web page catalog described above. By displaying or saving the application call in the specified format (e.g., HTML), the user can incorporate the call in a web page, perhaps with other application calls created using different application definitions. Alternatively, the application call can be transmitted to a computer running the corresponding service (block 240), for instance, by performing a remote procedure call to the service (that computer on which the service is running may be either the same computer on which the software is running or a different computer), performing the remote procedure calls to the service, as described above (block 236), or transferred to a server (perhaps server 116) for execution (e.g., performing a remote procedure call using the application call), in order, for example, to performance test the application call on the server using testing software such as LoadRunner™, commercially available from Mercury Interactive™.

Optionally, if the application call is executed either locally (block 236) or from a server, the software can display for the user any result generated by the service in response to the execution (block 244). In this way, the user immediately can test the application definition with a particular data set to determine whether the service produces the expected results. Additionally, the user may create an application call with incorrect data in order to test the service's ability to deal with improper data. Moreover, the user can evaluate the service's results or performance with a variety of different data sets by creating an application call for each data set and then using each respective application call for testing purposes. Those skilled in the art can appreciate the great variety of testing schemes that can be accommodated by the illustrated embodiment.

In other embodiments, the software can create a "personal portal" for a particular user, such that each application definition, along with any associated functions, instantiated functions and application calls, can be saved, cataloged and quickly accessed by that user. Such a portal also can include the results of tests performed using the user's application calls. Other embodiments provide context-sensitive help for the user, such that the user quickly and easily can access relevant help (including perhaps, a schematic diagram of the current function, along with text explaining the variable elements associated with that function). Still other embodiments provide the user with a facility to download pages incorporating particular services, application definitions or application calls, further facilitating the development and testing processes.

Figure 3A:
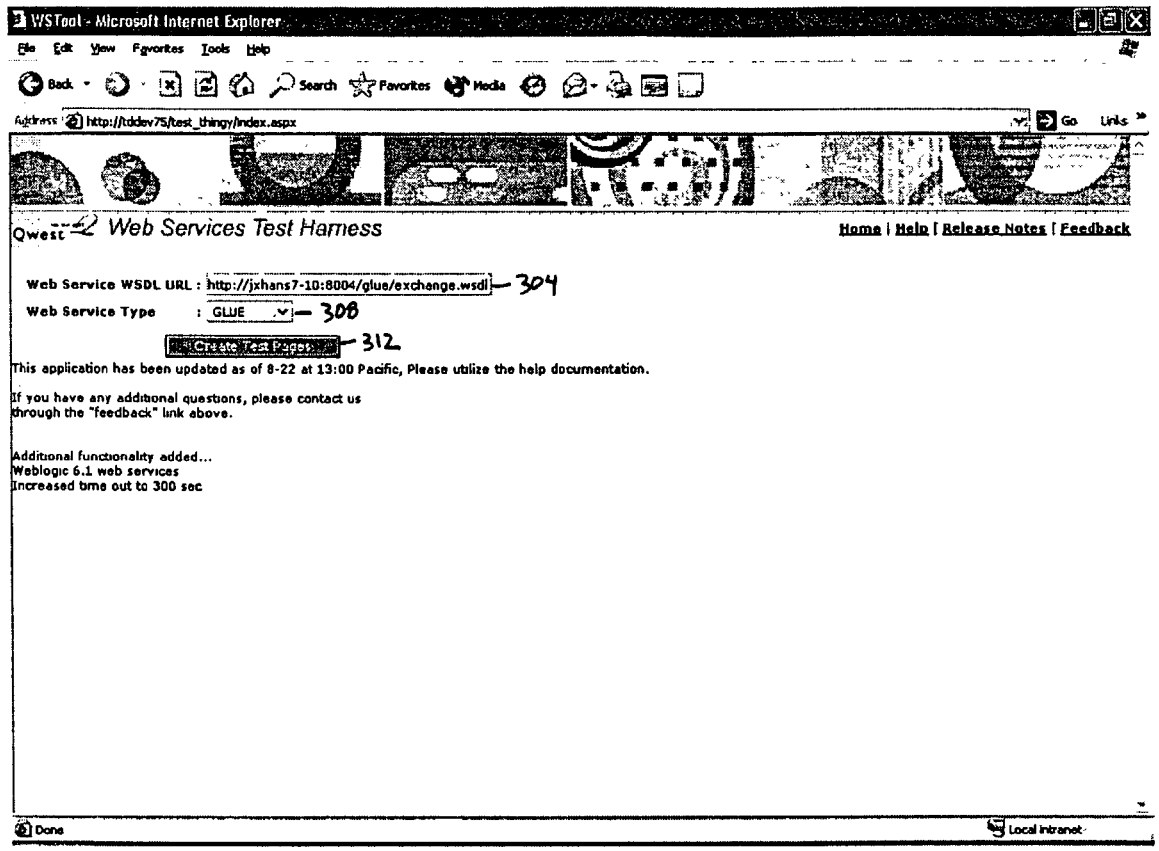
FIG. 3A illustrates an example screen display that can be used to receive application information for an application definition according to certain embodiments of the invention.

FIGS. 3A-6 illustrate example screen displays from a software application that can be used to create an application call involving a complex object, according to one embodiment of the invention. FIG. 3A is an example screen display 300 that can allow a user to provide application information, as described above. In this example screen, the user can provide, for example, a URL to the desired application definition, using field 304. Alternatively, other methods of providing location information could be employed. For instance, the user could provide a file name for a local application definition (e.g., by choosing the file name and directory location from a menu, in a manner familiar to those skilled in the art) or could hyperlink to a remote application definition. Example screen 300 also can allow the user to specify the type of service to which the application definition pertains, using menu 308. As discussed above, certain embodiments omit this feature in favor of automatic identification of the service type, and certain other embodiments need not identify the service type at all. Once the user has provided the application information, the software can be instructed to retrieve the application definition using, for example "Create Test Pages" button 312.

Figure 3B:
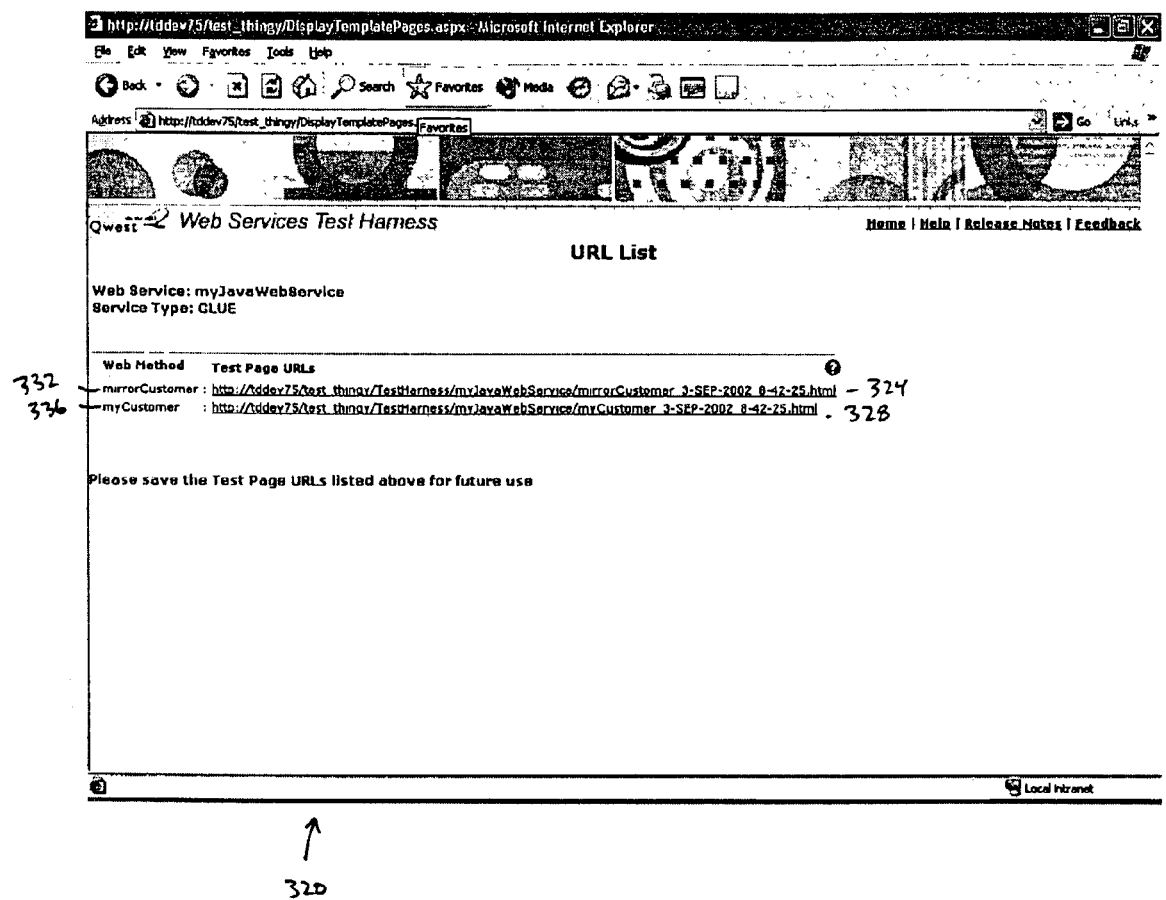
FIG. 3B illustrates an example screen display that can be used to select a function for which to create an application call according to certain embodiments of the invention.

Typically, a retrieved application definition will comprise multiple functions, from each of which an application call may be formed. FIG. 3B therefore illustrates an example screen display 320 that can be used to choose a function from the retrieved application definition for which to create an application call. In certain embodiments, a screen such as screen display 320 can be presented to the user after the software has retrieved and parsed the desired application definition to determine the functions contained by that application definition. A representation of each function can be displayed, merely by way of example, with hyperlinks 324, 328. For ease of reference, the name of each function can be displayed to the user in the form of labels 332, 336 or through other means known in the art. The user may choose the desired function by selecting the appropriate hyperlink (e.g., 324). It will be appreciated, of course, that example screen display 320 (and all of the example screen displays for that matter), are provided only for ease of illustration and that the claimed invention should not be considered to be limited to the methodology used in these example screen displays. For instance, other methods of selecting a particular function (such as displaying a graphical representation of the function, for instance) could also be implemented according to other embodiments of the invention.

Figure 4:
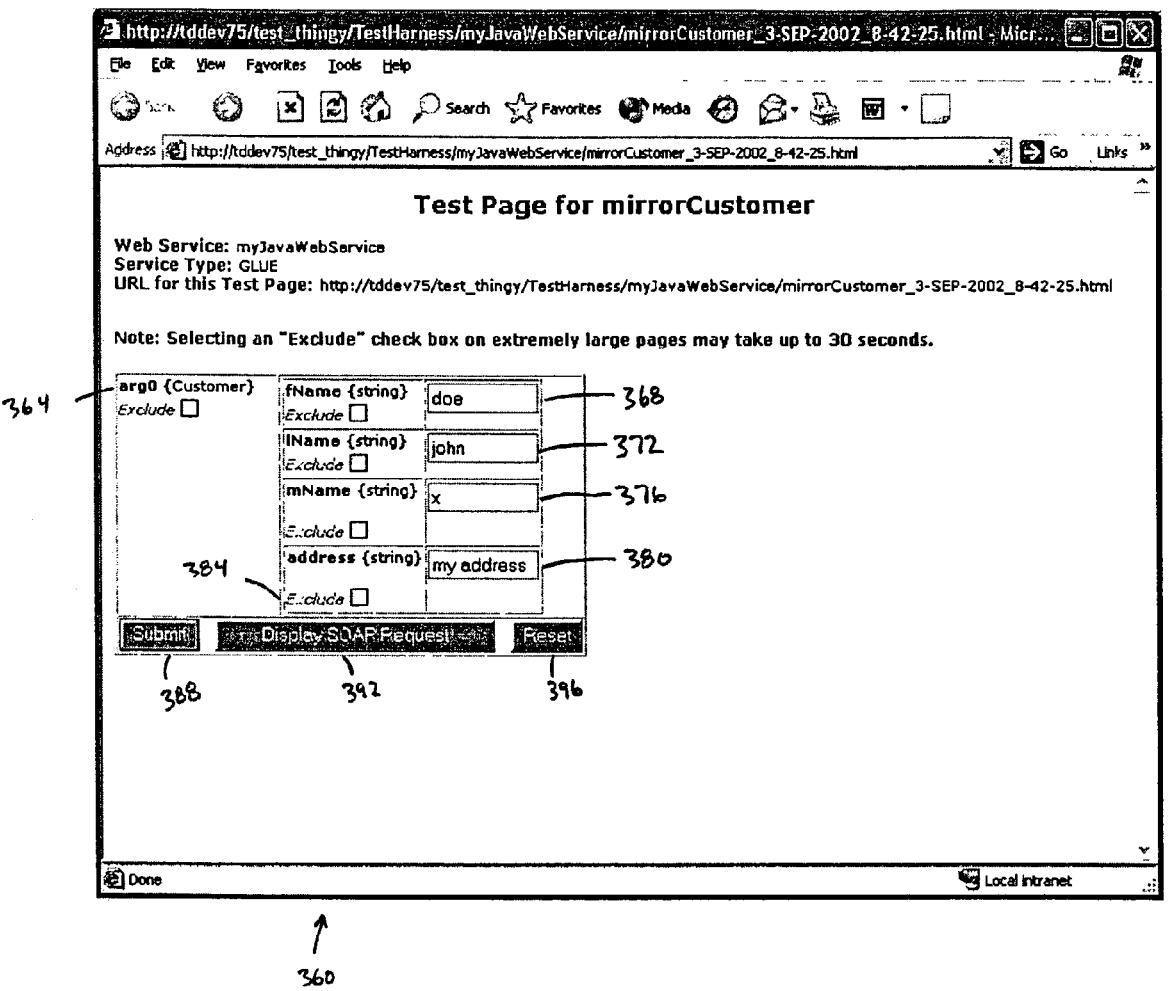
FIG. 4 illustrates an example screen display that can be used to receive data for variable elements according to certain embodiments of the invention.
Figure 6:
FIG. 6 illustrates an example screen display that can be used to display the results received from a service in response to an application call according to certain embodiments of the invention.
Figure 7A:
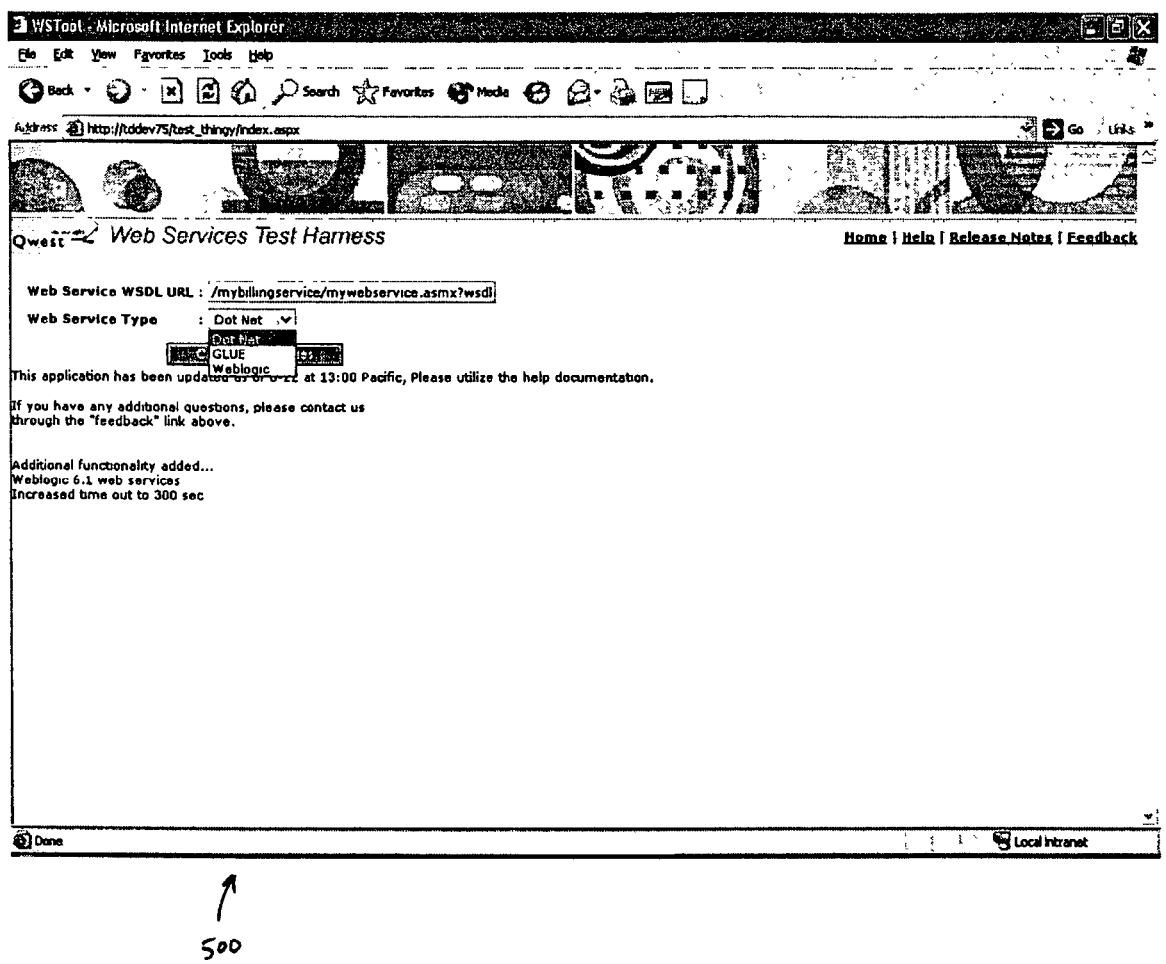
FIG. 7A illustrates an example screen display that can be used to receive application information for an application definition according to certain embodiments of the invention.
Figure 7B:
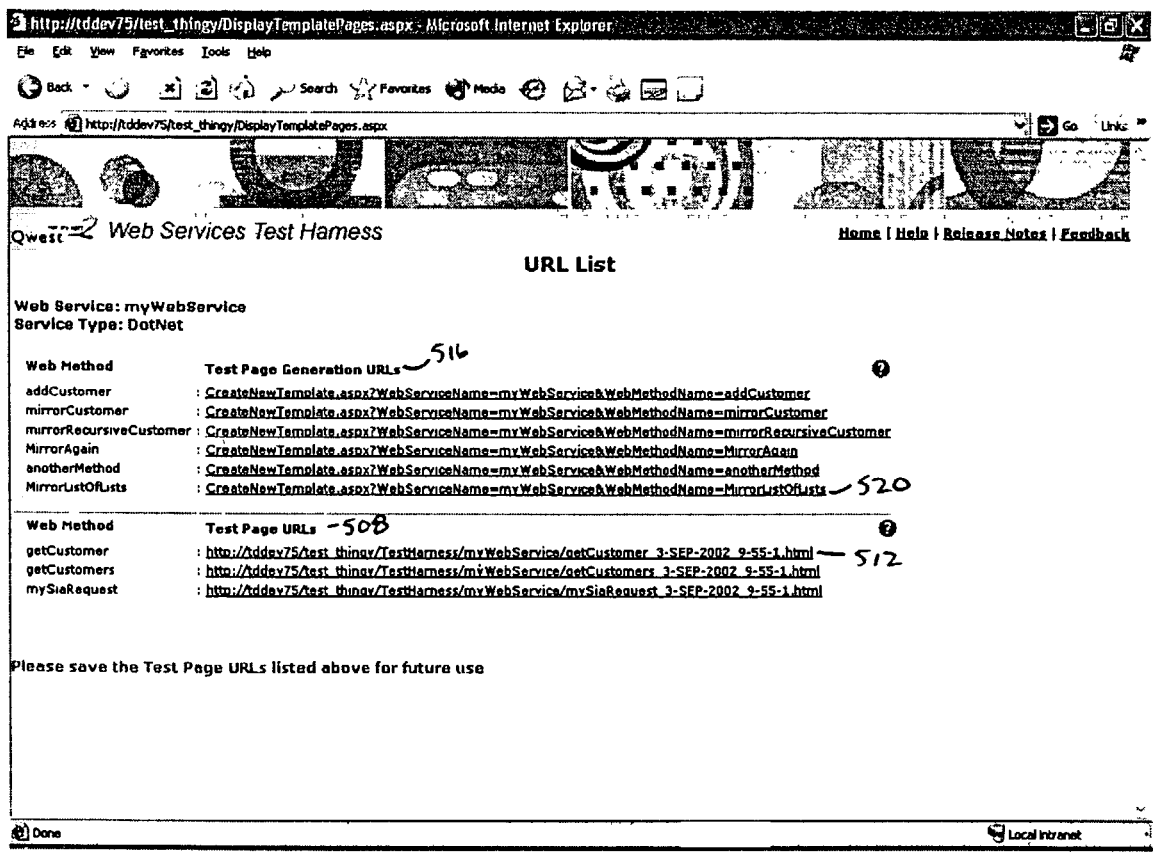
FIG. 7B illustrates an example screen display that can be used to select a function from which to create an application call according to certain embodiments of the invention.

FIG. 4 shows an example screen display 360 that can be used to display to the user each of the variable elements included in the selected function and to allow the user to provide data for each variable element. For instance, the function displayed in example screen display 360 contains one complex variable element entitled "arg0," denoted by label 364, which is of the "customer" data type. The arg0 variable element comprises four simple variable element entitled "fName," "lname," "mName," and "address," each of which is a string data type. The user can provide data for each of the simple variable elements using fields 368, 372, 376, 380, respectively. In certain embodiments, the user has the option to exclude a particular variable element from the application call; in this example, for instance, the user can select checkbox 384 to exclude the address element from the application call. In this way, if the user would prefer not to provide data for a particular variable element, the user can avoid sending an "empty" element in the application call. In addition, the user can use the "exclude" function to test error conditions.

In this example, after the user has provided the necessary data on example screen 360, no more iterations through the process are necessary, since none of the fields on example screen 360 are parameters for complex objects that need to be further instantiated. Thus, the software can create the completed application call at this point. According to this example, therefore, the user can request that the software create the application call and transmit it to the appropriate web service by selecting "Submit" button 388. In this way, the user can provide data, submit the data to the service, receive a result (discussed below), view the result or save the result to a file, and repeat the process with the same or different data, all in a very efficient, convenient manner. Alternatively, in certain embodiments, the user can choose instead to have the software create the application call and display it for the user to view, for instance by selecting "Display SOAP Request" button 392. Finally, the user can choose to reset all displayed fields by selecting the "Reset" button 396, which, in certain embodiments, can delete all of the data in displayed fields, allowing the user quickly to enter a new data set.

If the user chooses to view the application call (perhaps by pressing button 392 on example display screen 360), the software can create and display the application call, for instance by using a screen similar to example screen display 400 on FIG. 5A. Example screen display 400 includes a window 404 containing the application call. In this example, the application call is a SOAP request, and window 404 contains the proper "SOAP envelope" (as the term commonly is used in the art) for submitting the application call to the appropriate service. Beneficially, the software also can display the appropriate HTTP information (e.g., headers, formatting tags, etc.) to allow the application call to be copied from window 404 and pasted into another document, perhaps a web page. In this way, the illustrated embodiment can be used quickly and inexpensively to develop a customized web application that includes a variety of application calls to different services, all from one or more related web pages. In certain embodiments, in fact, the application call can function as a standalone application if placed on a web server. In addition, the application call displayed in window 404 also is formatted readily to be accessible by software testing applications such as LoadRunner™ or any other automated test tool. In other embodiments, the software can offer an option to save the displayed text to a file or to send the displayed text directly to a different software application for further processing.

In some embodiments, the software instead can display the application call without the HTTP information, in order to allow for easier viewing by the user. For example, on example screen 400, the user can select the "Display Formatted SOAP Request" button 408. If button 408 is selected, the software can display the SOAP envelope without any HTTP headers, as illustrated by example display screen 420 on FIG. 5B. In certain embodiments, screen 420 also can include a button with functionality similar to "Submit" button 388 illustrated on FIG. 4, such that the user can request that the software transmit the displayed application call to the appropriate service. In other embodiments, example display screens 400, 420 can allow the user the option manually to edit the application call before saving, transmitting and/or otherwise processing the application call.

In certain embodiments, if the user chooses to transmit the application call to the service, the software can receive a result from the service, wherein the result consists of the output from the service after processing the data in the application call. The software also can display the result for the user, as illustrated in example screen display 428 on FIG. 6, save the result to disk, and/or transmit the result to a different application (either local or remote) for further processing. In this way, this embodiment allows for a robust testing environment, where the output from each application call can be viewed immediately, saved for later reference, and/or analyzed by a different application.

FIGS. 7A-12 illustrate example screen displays according to yet another embodiment of the invention. As described with reference to FIGS. 3A-3B, example screen display 500 on FIG. 7A allows the user to specify the application information for the desired application definition, while example screen display 504 on FIG. 7B allows the user to select the desired function from those contained in the application definition. As discussed above, when parsing the application, the software can determine the complexity of the variable elements in each function. Thus, as illustrated on FIG. 7B, screen display 504 optionally can allow the user easily to distinguish between functions that will require more than one iteration (for instance, first to provide required parameters to resolve or instantiate a complex variable element and then to provide necessary data to create the application call, as detailed below) and functions from which an application call can be created using only one iteration through the process (for instance, functions containing only simple variable elements).

For example, those functions under the heading "Test Page URLs" 508 can generate an application call with only one iteration, such that the user can select, for instance, hyperlink 512, and the application, in response, can display a screen similar to example display screen 360 in FIG. 4. In contrast, those functions containing more complex variable elements can be displayed under the heading "Test Page Generation URLs" 515. Such functions generally will require "metadata" in the form of parameters, which define the nature of the objects to be instantiated, before actually accepting "substantive" data to fill those objects. (For purposes of this document, both metadata and substantive data are encompassed by the term "data.") Moreover, for some relatively complex functions, there might be required multiple iterations of this instantiation process required before substantive data can be entered. This iterative process can be understood most easily by reference to a particular example.

Figure 8A:
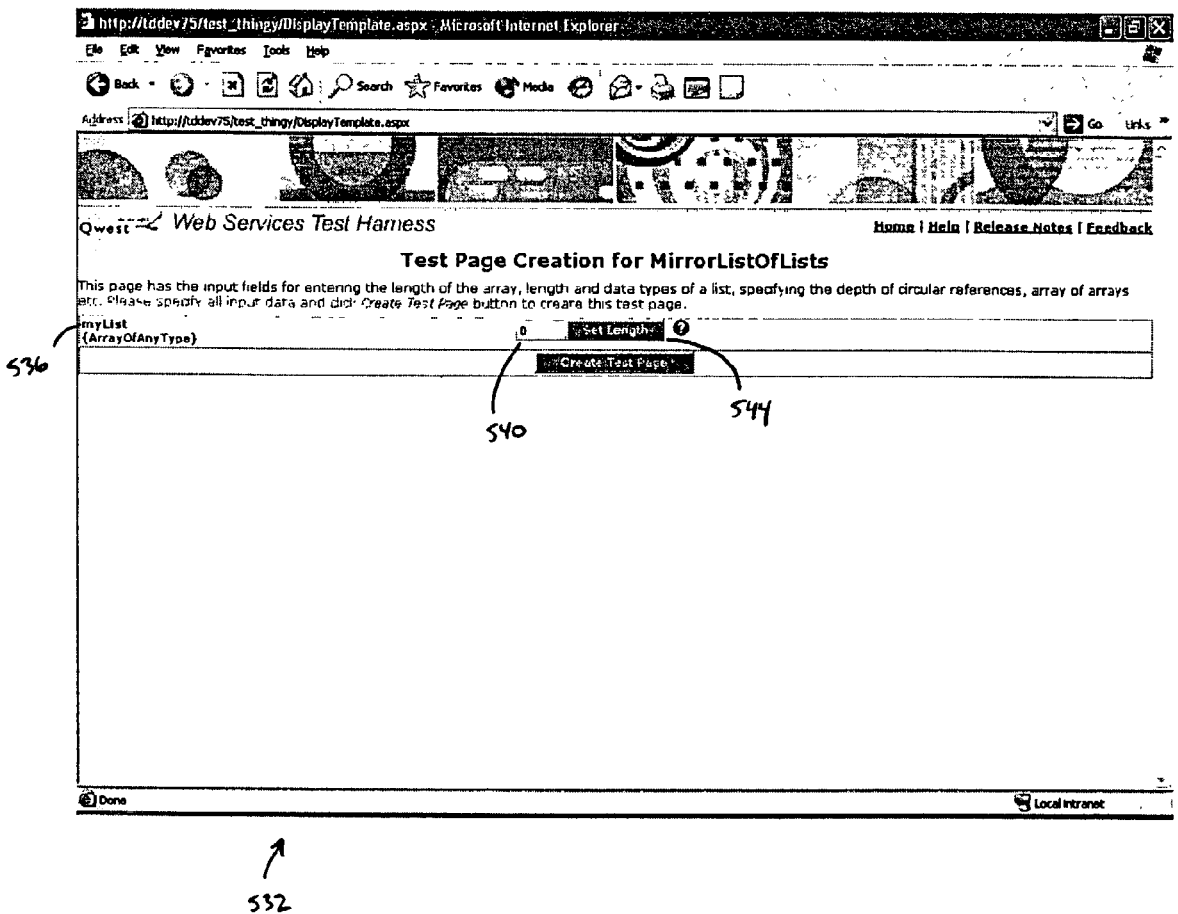
FIGS. 8A-8C illustrate example screen displays that can be used to receive data for variable elements according to certain embodiments of the invention.
Figure 8B:
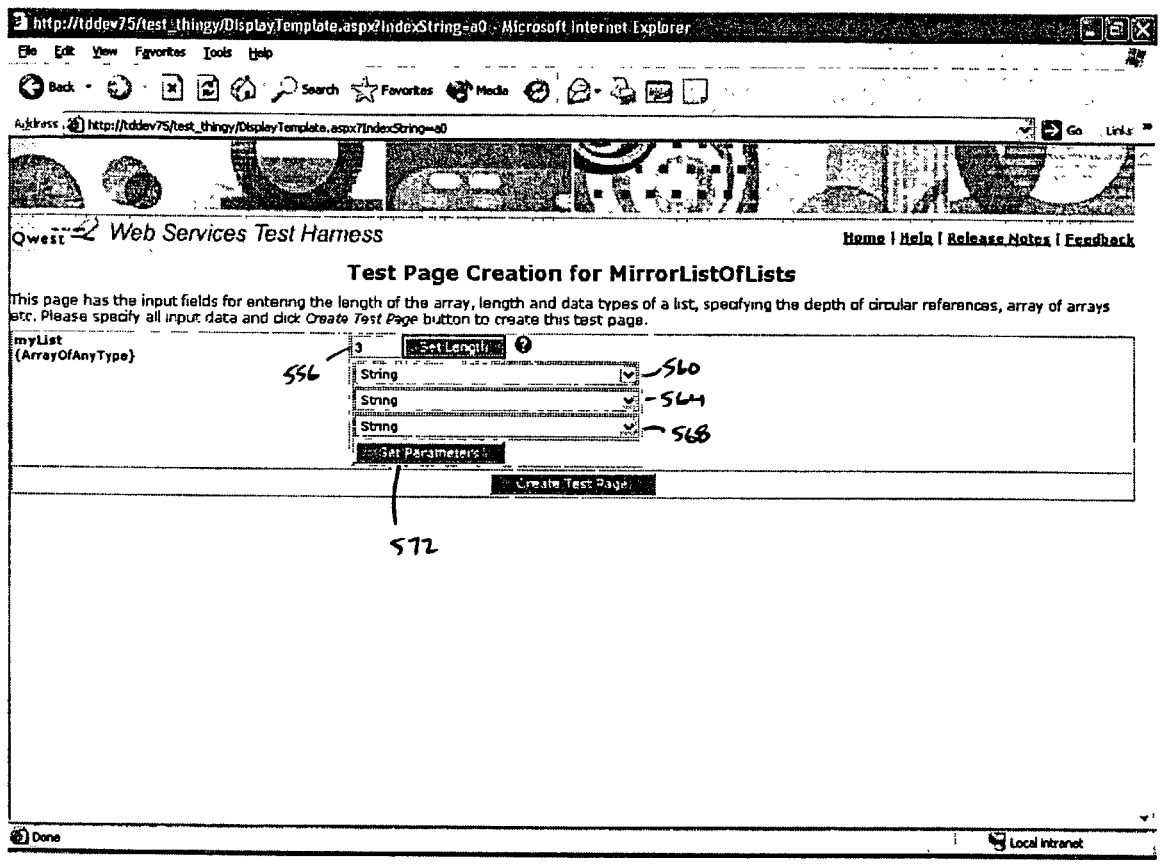
Figure 8C:
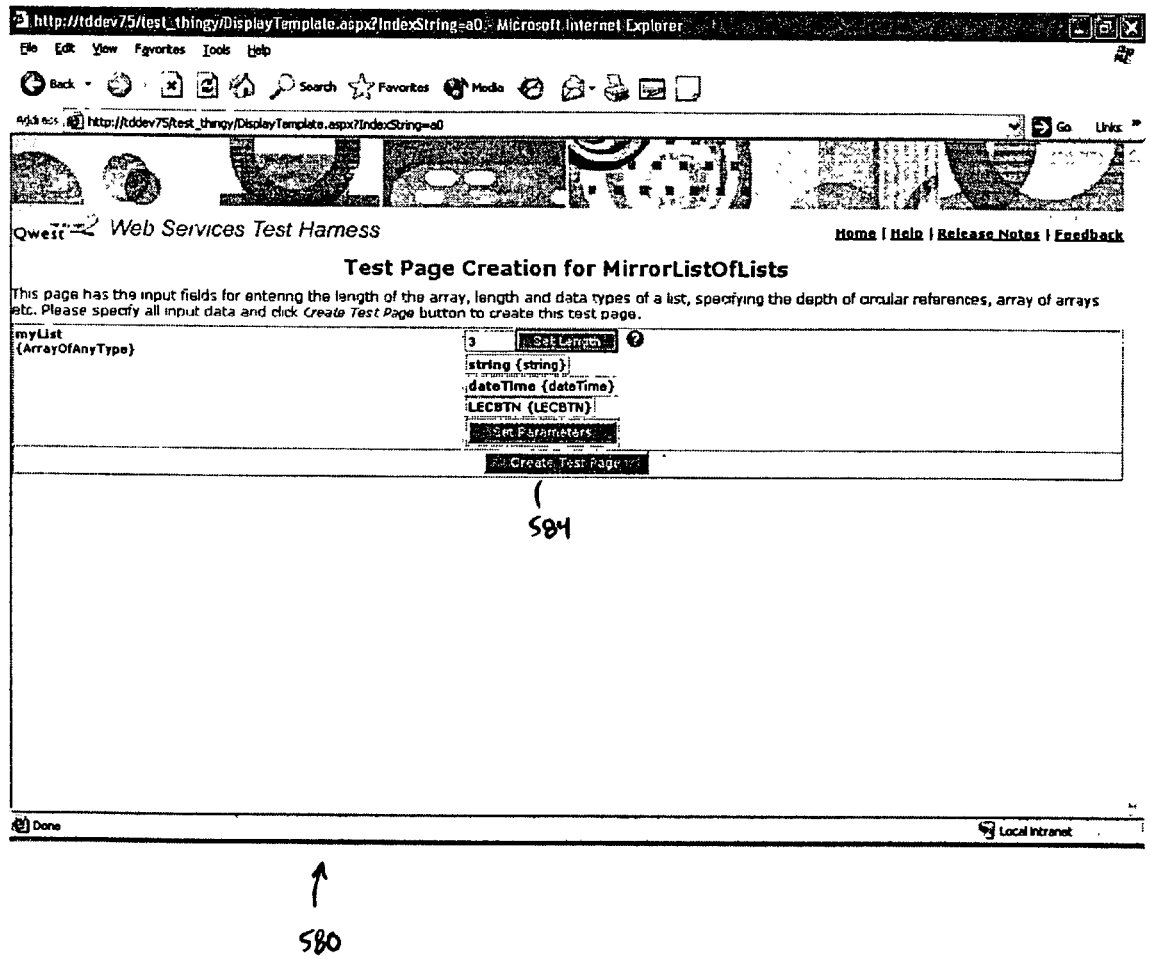

Thus, for instance, if a user selects hyperlink 520, the software can present a screen such as example display screen 532 on FIG. 8A, which shows a relatively complex variable element of type "ArrayOfAnyType," entitled "myList" 536. Because the myList element is a type of variable-length array, the first parameter required for this element is the number of members the array should hold. The user may provide that parameter in field 540, and by selecting "Set Length" button 544, the user may instruct the software to create an instance of the myList array with the specified number of members. Thus, as shown on FIG. 8B, example screen 552 displays an instance of myList, with three empty members, as specified in field 540 on FIG. 8A. Another iteration of the instantiation process is required in this example, however, because each member of myList can have a different data type.

Consequently, the user may select the data type for each of the three members of myList, by choosing from selection menus 560, 564, 568, respectively. After selecting the data types, the user may submit this data to the software by selecting the "Set Parameters" button 572. As shown on example screen display 580 on FIG. 8C, after receiving the parameters, the software can allow the user to complete this second iteration of the instantiation process, perhaps by selecting the "Create Test Page" button 584, which will instruct the software to create an instance of the function with the provided metadata. Notably, when the user chooses to create a test page using button 584, this indicates that all metadata parameters have been provided and the next instance of the function will be ready to accept substantive data. Thus, in certain embodiments, the software either will not allow the user to select this feature until all required metadata has been provided or will warn the user prior to allowing such a selection.

Figure 9:
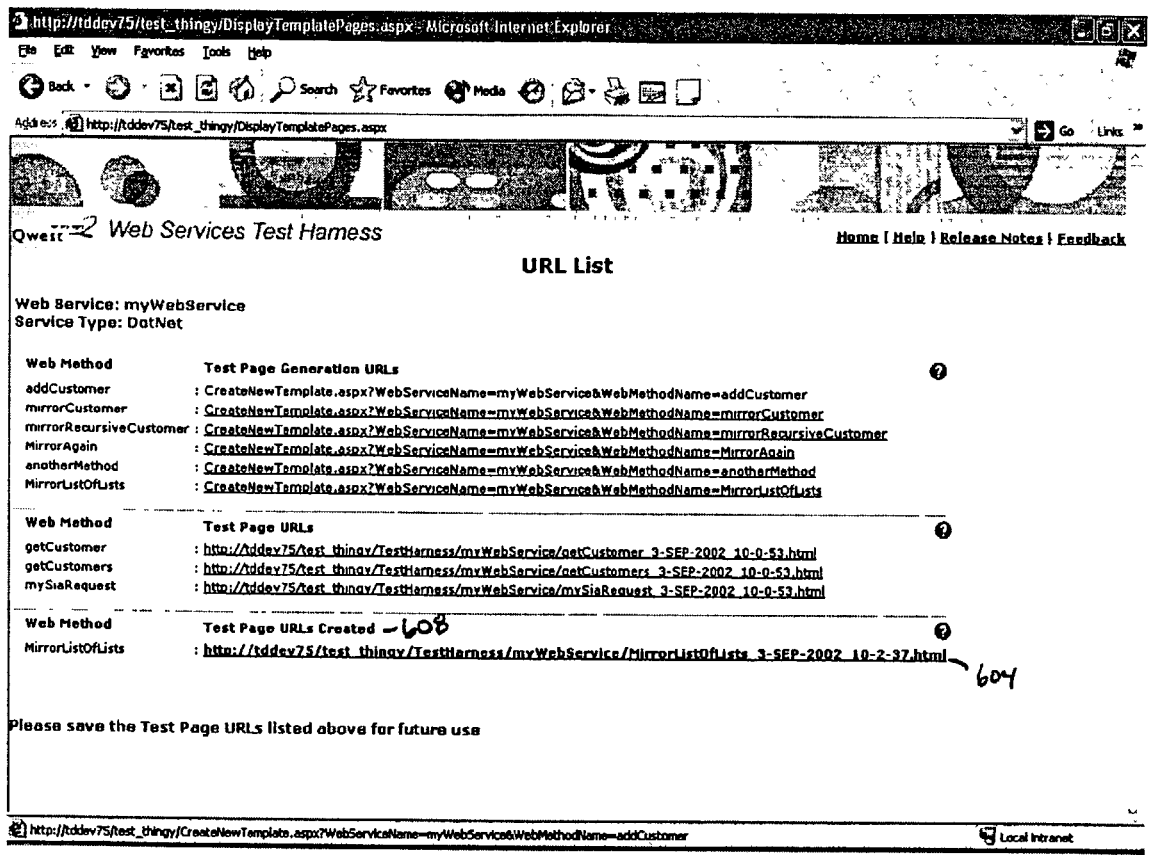
FIG. 9 illustrates an example screen display that can be used to select an instantiated function according to certain embodiments of the invention.

In certain embodiments, after the user instructs the software to instantiate a function ready to be populated with substantive data (perhaps by selecting button 584), the software either immediately can display the instantiated function (thus allowing the user to enter the necessary substantive data at that time) or provide a reference to the instantiated function, so that the user may choose to provide the substantive data for that function at a later time. Referring to FIG. 9, in this example, the software can produce example display screen 600, which in addition to including references to all of the functions in the application definition (similar to the display screen 504 on FIG. 7B), now also provides a reference to the instantiated function, as indicated by hyperlink 604, under the heading "Test Page URLs Created" 608. If the user selects hyperlink 604, the software can show all of the variable elements requiring the entry of substantive data, as defined by the parameters entered on display screens illustrated on FIGS. 8A-8C.

Figure 10:
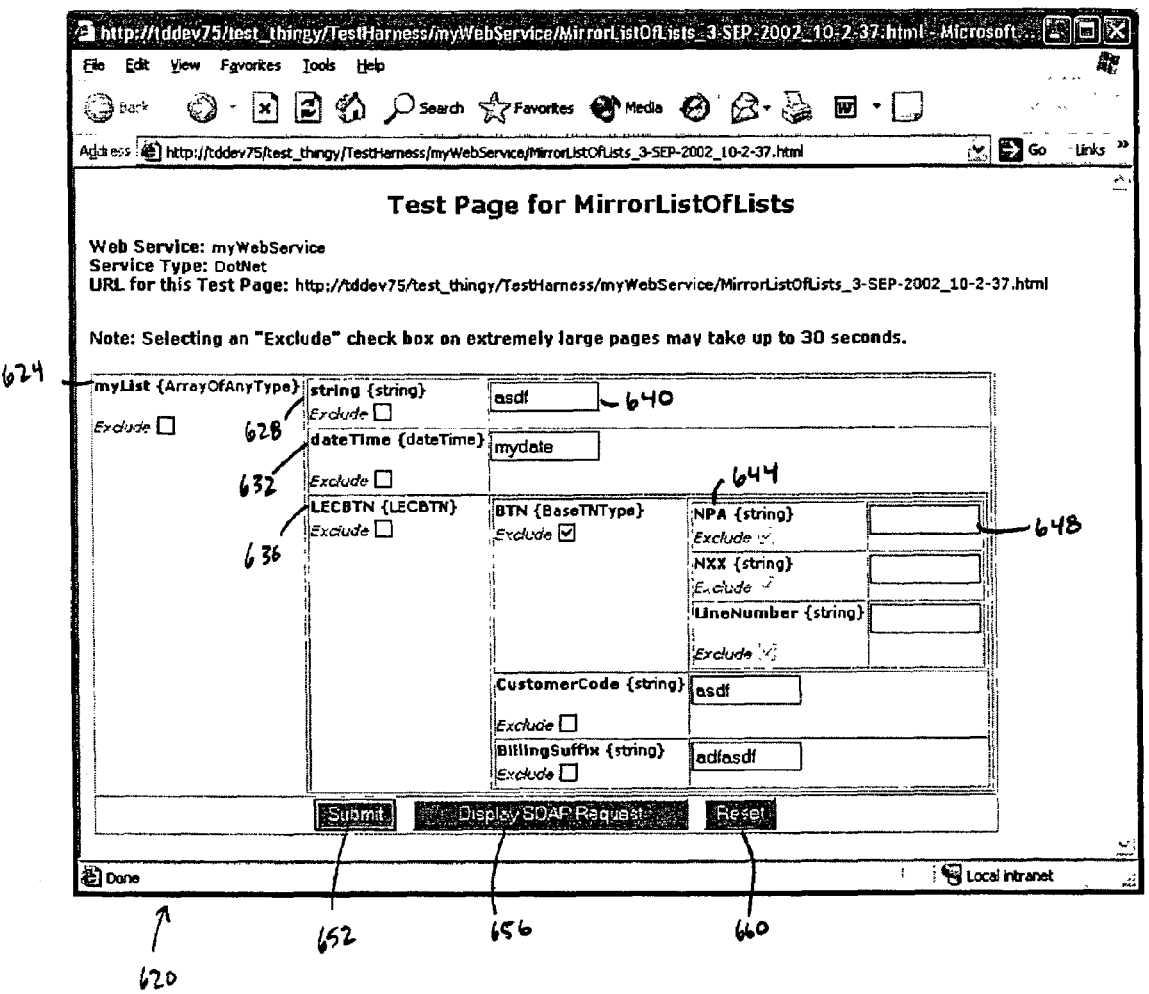
FIG. 10 illustrates an example screen display that can be used to receive data for variable elements according to certain embodiments of the invention.

For example, after user selects hyperlink 604, the software can present to the user a screen similar to example screen display 620 on FIG. 10. One skilled in the art will appreciate that each of the fields on-screen 620 corresponds to a parameter entered as described above. For instance, the myList array has three members, one of type string 628, one of type date/time 632, and one of type LECBTN (which itself is a complex variable element) 636. The user can populate each of these variable elements with the desired data using the corresponding fields (e.g., 640). Notably, since the LECBTN element is a complex variable element itself, it can contain one or more variables (e.g., 644), for each of which data may be provided, using the appropriate field (e.g., 648). In certain embodiments, as described in detail above, particular elements can be excluded from the application call, and the user may transmit the application call to the appropriate web service using "Submit" button 652, view the application call using "Display SOAP Request" button 656, or reset the fields on screen 620 using "Reset" button 660. Likewise all of the functionality discussed with reference to FIGS. 5A-6 can be provided in this embodiment as well.

Figure 11:
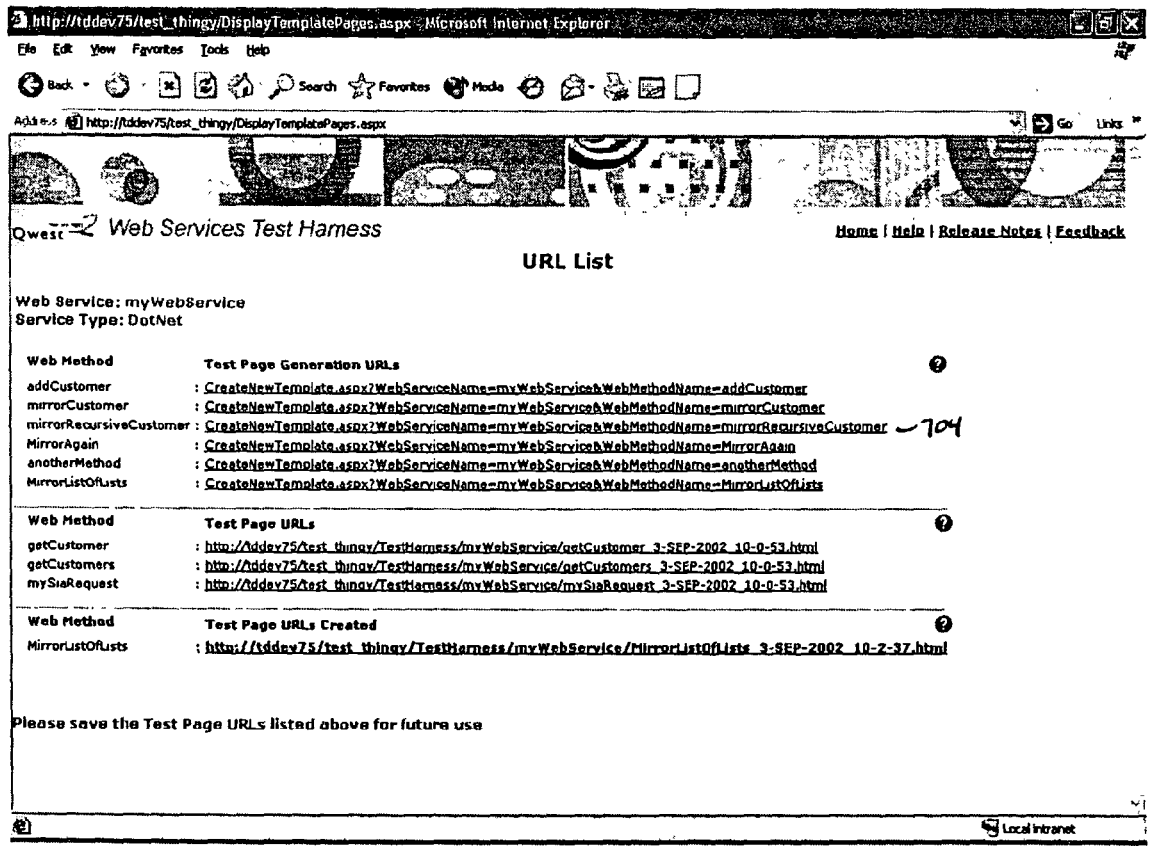
FIG. 11 illustrates an example screen display that can be used to select an function from which to create an application call according to certain embodiments of the invention.
Figure 12A:
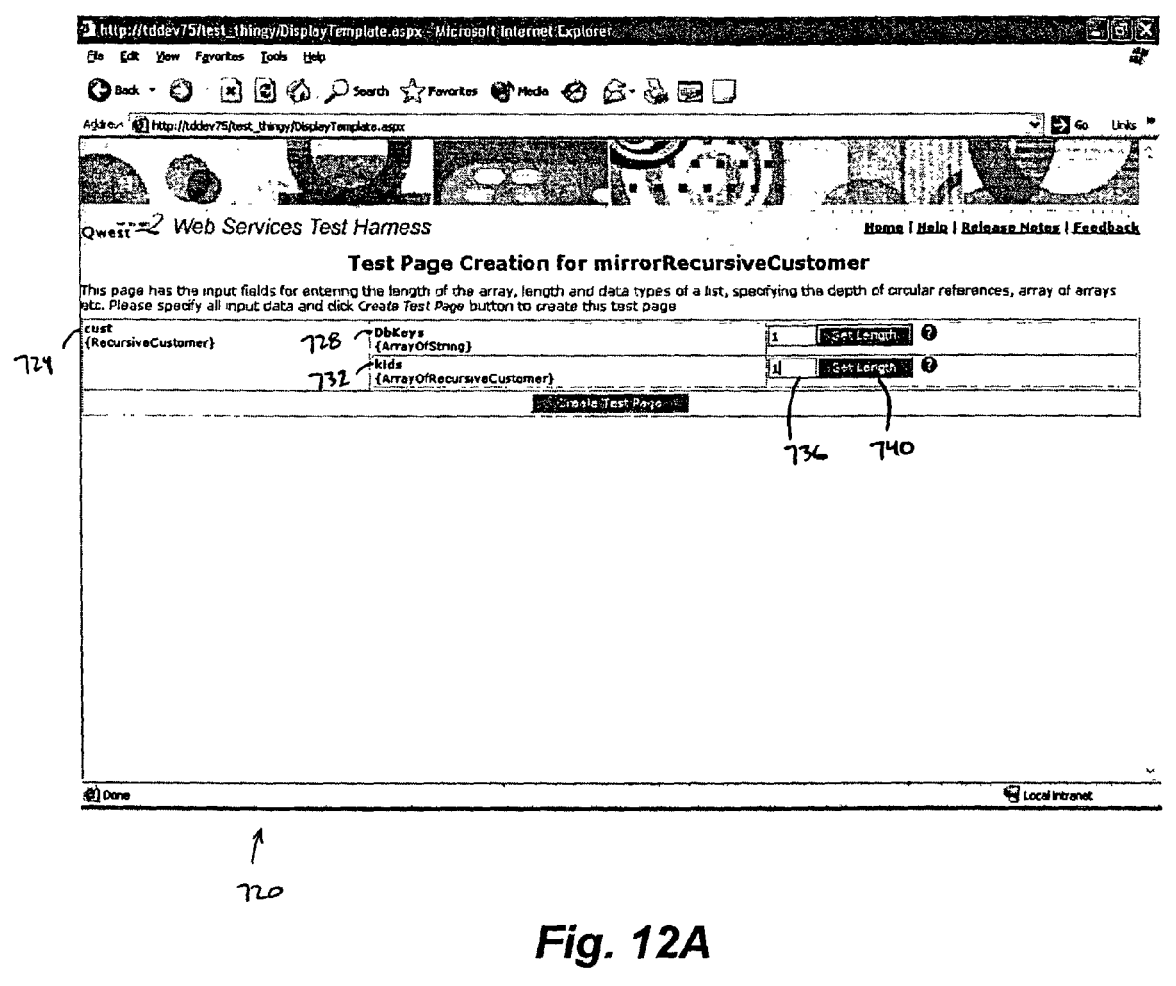

Turning now to FIGS. 11-12D, an example is provided of certain embodiments that are capable of handling super-complex variable elements, such as those include circular references featuring recursion (where, by way of example, an instance of a first variable element contained within an instance of second variable element also contains a different instance of the second variable element, which itself contains a different instance of the first variable element, and so forth ad infinitum). In certain aspects, the invention is capable of handling infinite levels of recursion, limited only by the processing resources available to the software.

FIG. 11 shows an example display screen 700 that can provide references to functions in an application definition that has been retrieved and parsed as described above. Of particular interest, display screen 700 includes a reference 704 to a function called "mirrorRecursiveCustomer," which illustratively features a recursive variable element. Upon selecting link 704 in this example, the user is presented with example screen display 720, as shown on FIG. 12A. Screen 720 displays a variable element of type "RecursiveCustomer" entitled "cust" 724, which contains two variable elements, DBKeys 728 and kids 732. Of particular interest, variable element kids 732 is of type "ArrayOfRecursiveCustomer," such that it is a (variable-length) array, of which each member is a variable element of type RecursiveCustomer. Proceeding with the example, if the user specifies in field 736 that that the kids array has one member and selects the "Set Length" button 740, the software can instantiate the kids variable element as an array containing one RecursiveCustomer member.

Figure 12B:
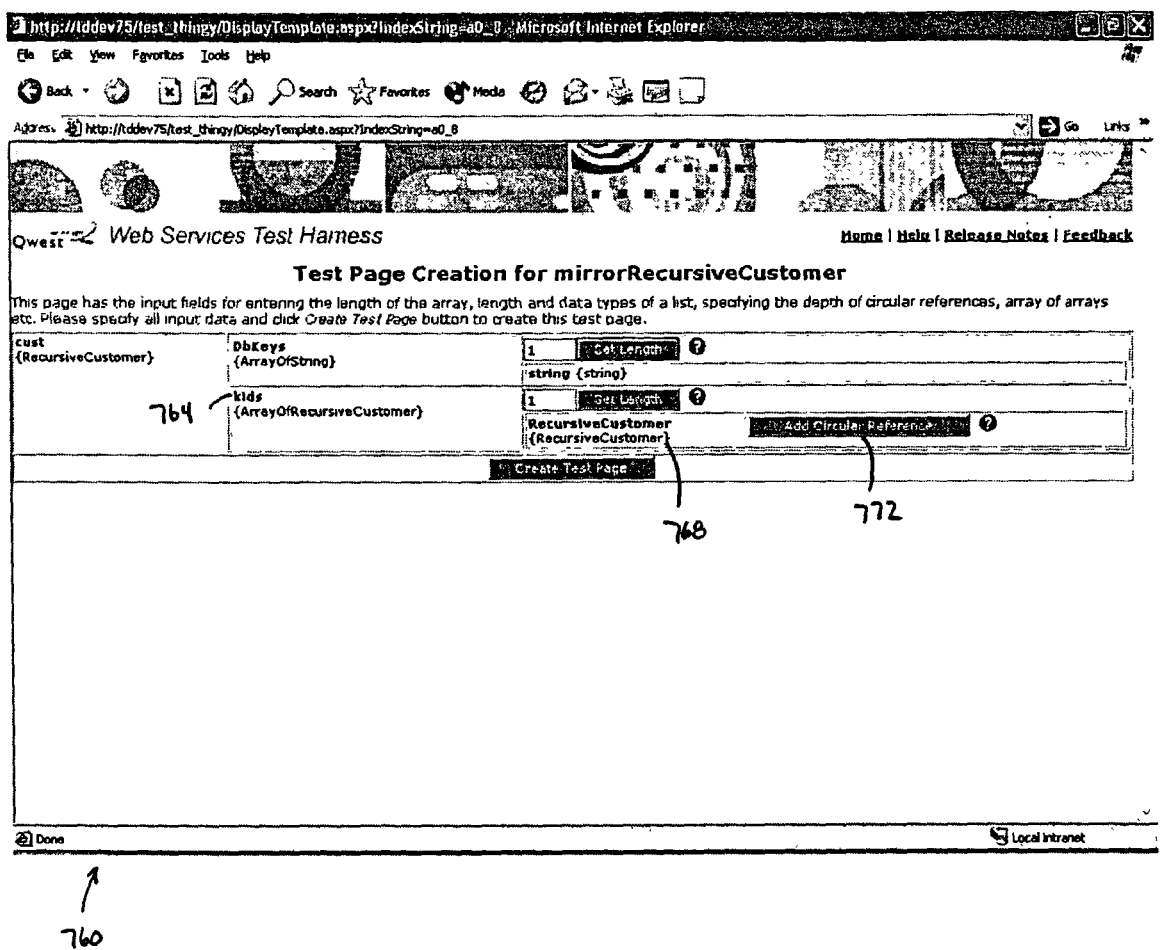
Figure 12C:
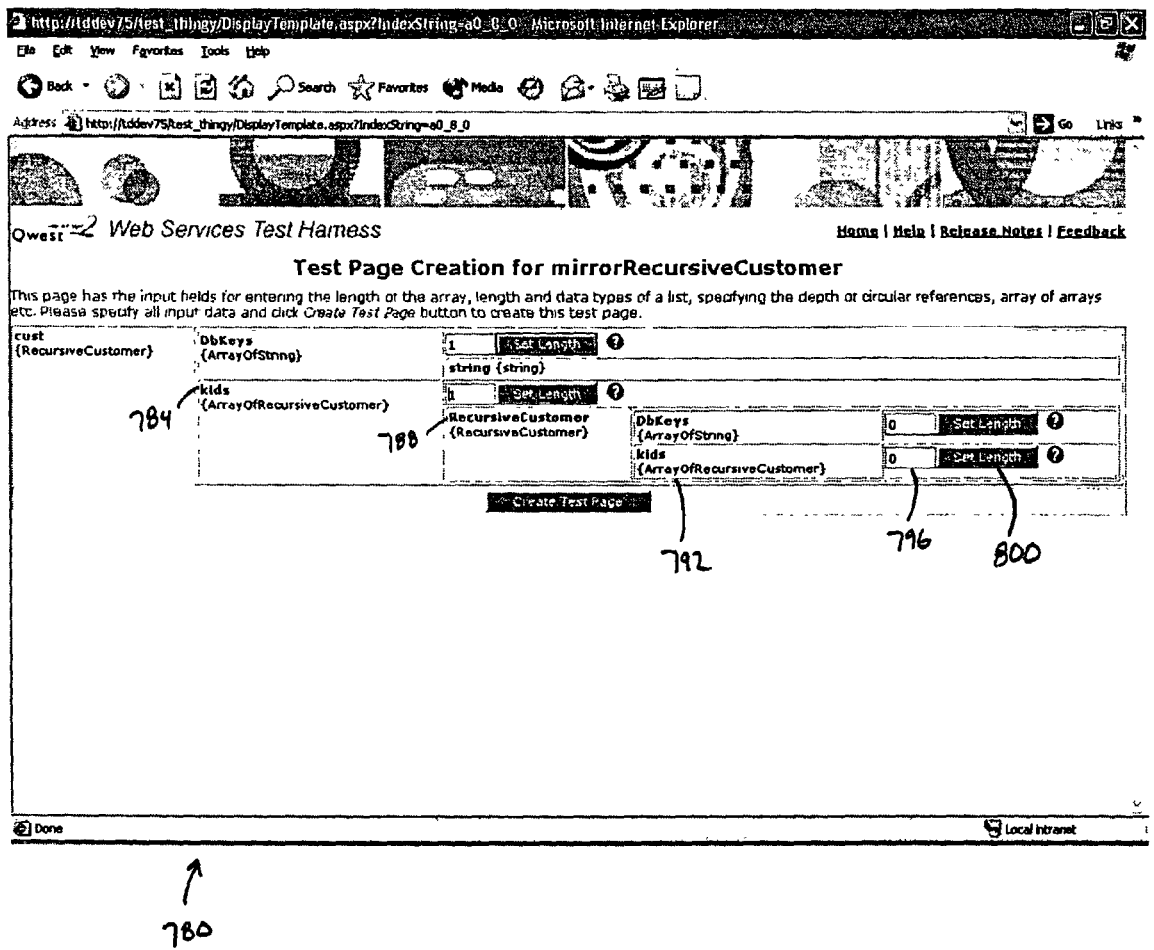
Figure 12D:
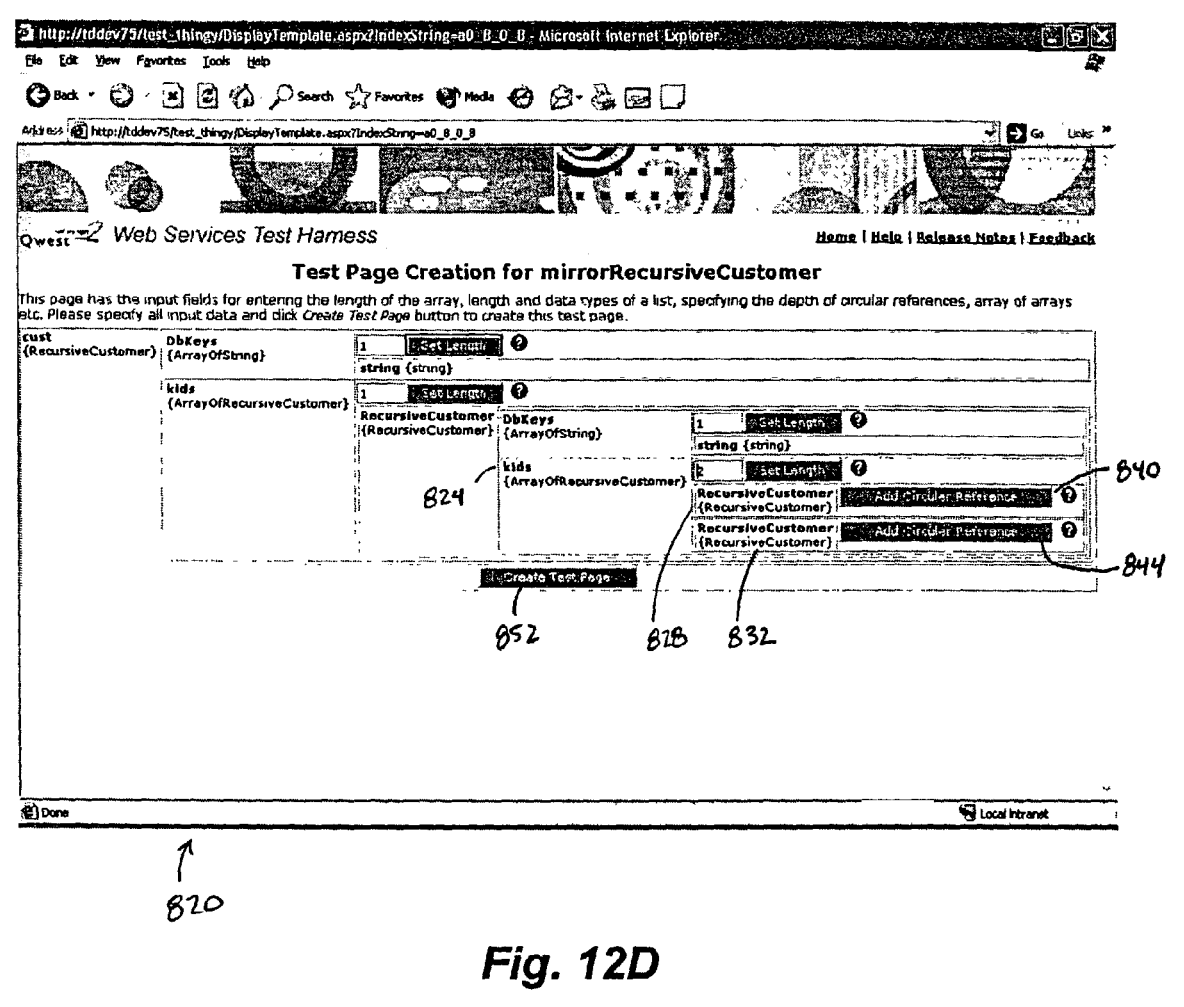

To wit, FIG. 12B shows example screen display 760 showing the kids element 764 having a single RecursiveCustomer member 768. Moreover, by selecting the "Add Circular Reference" button 772, the user can instruct the software to implement an additional level of recursion. Thus, screen display 780 on FIG. 12C shows the kids element 784 having one RecursiveCustomer member 788, which contains, inter alia, a second instance of the kids variable element 792. Recursively, then, the user can specify the length of the second instance of the kids array 792 using field 796 and can submit that parameter to the software using "Set Length" button 800. If the user specifies that the second kids array 792 should have two members, the software can perform the instantiation process again, producing a screen similar to display screen 820 on FIG. 12D, which shows the second instance of the kids array 824 having two RecursiveCustomer members 828, 832. By using buttons 840 and 844 respectively, the user can instruct the software to create additional circular references for members 828 and 832. As noted above, this recursive process can continue until the user has attained the desired level of recursion and/or the software has consumed all available processing resources. At that point, the user can choose to create an instance of the function ready to accept substantive data, perhaps using the "Create Test Page" button 852, as described above with reference to FIGS. 8C-9. After the substantive data has been entered, the application call may be created, viewed and utilized as described above.

In this way, certain embodiments of the present invention can support super-complex variable elements, including recursive variable elements and complex variable elements that contain other complex variable elements. By way of example, some embodiments can create application calls from functions including variable-length lists or arrays, as described above. Other embodiments can create application calls from functions having a variable number of lists or arrays, each of which can be of variable length, also as described above. Likewise, application calls can be created from functions having circular references. Finally, particular embodiments, such as the one described with reference to FIGS. 11-12D, can create application calls that contain various combinations of circular references and variable numbers of variable-length arrays or lists.

In conclusion, the present invention provides novel systems and methods for creating application calls to facilitate the development and testing of a wide variety of web services. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for testing a web services application, the method comprising:
   accessing an application definition;
   reading the application definition to determine a function and at least one variable element associated with the function, wherein the variable element comprises a complex type and wherein the complex type includes at least one parameter;
   prompting a user to enter data for each variable element requiring user input, wherein prompting a user comprises:
   (a) prompting a user to enter data for the each parameter requiring user input;
   (b) instantiating a new function using the entered data
   (c) determining whether the new function includes at least one variable additional element of the complex type requiring user input by interrogating the new function; and
   (d) repeating (a), (b), and (c) in response to determining the new function includes at least one variable element requiring user input; and
   creating an application call from the new function and the entered data in response to determining the new function does not include at least one variable element requiring user input.

2. The method of claim 1, wherein the variable element comprises substantive data.

3. The method of claim 1, further comprising transmitting the application call to a computer running a service, wherein the service corresponds to the application definition.

4. The method of claim 3, further comprising receiving a result from the computer, wherein the result is generated by the service in response to the application call.

5. The method of claim 1, wherein creating an application call comprises creating an application call from the new function.

6. The method of claim 1, wherein the complex type comprises a type selected from the group consisting of a circular reference, a variable-length list, a variable number of lists, a variable number of variable-length lists, a combination of a circular reference and a variable-length list, a combination of a circular reference and a variable number of lists, and a combination of a circular reference and a variable number of variable-length lists.

7. The method of claim 1, further comprising creating an HTML document including the application call.

8. The method of claim 1, wherein reading the application definition comprises retrieving the application definition and parsing the application definition to determine a plurality of functions, each with at least one associated variable element.

9. A method for testing web services, the method comprising:
(a) receiving application identification information from a user, wherein the application identification information includes the location of an application definition;
(b) accessing the application definition at the location specified by the application identification information;
(c) retrieving the application definition;
(d) parsing the application definition to determine a function including a variable element, wherein the variable element comprises a complex type, and wherein the complex type includes at least one parameter;
(e) creating a document displaying each parameter requiring user input;
(f) prompting the user to enter data for each parameter requiring user input;
(g) instantiating a new function using the entered data;
(h) determining whether the new function includes at least one additional variable element of the complex type requiring user input by interrogating the new function;
(i) repeating (e), (f), (g), and (h) in response to determining the new function contains at least one variable element requiring user input; and
(j) creating an application call comprising the new function in response to determining the new function does not include at least one variable element requiring user input.

10. The method of claim 9, wherein the application identification information further identifies the nature of the application definition.

11. The method of claim 9, further comprising transmitting the application call to a computer running a service, wherein the service corresponds to the application definition.

12. The method of claim 11, further comprising receiving a result from the computer, wherein the result is generated by the service in response to the application call.

13. The method of claim 9, further comprising creating an HTML document including the application call.

14. A system for testing web services, the system comprising:
a first computer comprising a processor; and
a computer-readable medium in communication with the processor, wherein the computer-readable medium comprises instructions executable by the processor to:
access an application definition;
read the application definition to determine a function and at least one variable element associated with the function, wherein the variable element comprises a complex type and wherein the complex type includes at least one parameter;
using an output device in communication with the processor, prompt a user to enter data for each variable element that requires user input, wherein prompting a user comprises:
(a) prompting a user to enter data for each parameter requiring user input;
(b) instantiating a new function using the entered data;
(c) determining whether the new function includes at least one additional variable element of the complex type requiring user input by interrogating the new function; and
(d) repeating (a), (b), and (c) in response to determining the new function includes at least one variable element requiring user input; and
create an application call using the new function and entered data in response to determining the new function does not include at least one variable element requiring user input.

15. The system of claim 14, wherein the application definition is stored on a second computer remote from the first computer and wherein accessing the application definition comprises establishing a network connection with the second computer.

16. The system of claim 14, wherein the application definition is stored on a storage device in communication with the processor.

17. The system of claim 15, wherein the computer-readable medium comprises further instructions executable by the processor to transmit the application call to a third computer running a service, wherein the service corresponds to the application definition.

18. The system of claim 17, wherein the computer-readable medium comprises further instructions executable by the processor to receive a result from the third computer, wherein the result is generated by the service in response to the application call.

19. The system of claim 17, wherein the third computer is selected from a group consisting of the first computer and the second computer.

20. The system of claim 14, wherein creating an application call comprises creating an application call from the new function.

21. The system of claim 14, wherein the complex type comprises a type selected from the group consisting of a circular reference, a variable-length list, a variable number of lists, a variable number of variable-length lists, a combination of a circular reference and a variable-length list, a combination of a circular reference and a variable number of lists, and a combination of a circular reference and a variable number of variable-length lists.

22. The system of claim 14, wherein the computer-readable medium comprises further instructions executable by the processor to create an HTML document including the application call.

23. The system of claim 14, wherein reading the application definition comprises retrieving the application definition and parsing the application definition to determine a plurality of functions, each with at least one associated variable element.

* * * * *